United States Patent
Choi

(10) Patent No.: US 10,427,638 B2
(45) Date of Patent: Oct. 1, 2019

(54) FRONTAL AIRBAG ASSEMBLIES FOR REDUCING ROTATIONAL VELOCITY OF A HEAD OF AN OCCUPANT

(71) Applicant: Autoliv ASP, Inc., Ogden, UT (US)

(72) Inventor: Changsoo Choi, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/177,227

(22) Filed: Jun. 8, 2016

(65) Prior Publication Data

US 2017/0355344 A1 Dec. 14, 2017

(51) Int. Cl.
| | |
|---|---|
| *B60R 21/233* | (2006.01) |
| *B60R 21/205* | (2011.01) |
| *B60R 21/2338* | (2011.01) |
| *B60R 21/235* | (2006.01) |
| *B60R 21/26* | (2011.01) |

(Continued)

(52) U.S. Cl.
CPC .......... *B60R 21/233* (2013.01); *B60R 21/205* (2013.01); *B60R 21/231* (2013.01); *B60R 21/235* (2013.01); *B60R 21/2338* (2013.01); *B60R 21/26* (2013.01); *B60R 2021/0004* (2013.01); *B60R 2021/0032* (2013.01); *B60R 2021/0048* (2013.01); *B60R 2021/23308* (2013.01); *B60R 2021/23382* (2013.01); *B60R 2021/23509* (2013.01)

(58) Field of Classification Search
CPC ..... B60R 21/233; B60R 21/26; B60R 21/235; B60R 21/205; B60R 21/2338; B60R 2021/23509; B60R 2021/0004; B60R 2021/0048; B60R 2021/23308; B60R 2021/0032; B60R 2021/23382
See application file for complete search history.

(56) References Cited

U.S. PATENT DOCUMENTS

| | | | |
|---|---|---|---|
| 5,044,663 | A | 9/1991 | Seizert |
| 5,205,584 | A | 4/1993 | Honda |

(Continued)

FOREIGN PATENT DOCUMENTS

| | | |
|---|---|---|
| DE | 102007032763 A1 | 1/2008 |
| DE | 102012018450 A1 | 3/2014 |

(Continued)

OTHER PUBLICATIONS

International Search Report and Written Opinion for PCT/US2017/028271, dated Jul. 3, 2017.

(Continued)

*Primary Examiner* — Darlene P Condra
(74) *Attorney, Agent, or Firm* — Stoel Rives LLP

(57) ABSTRACT

Airbag assemblies are disclosed that can reduce rotational velocity of an occupant's head during a collision event and thereby mitigate traumatic brain injury/head injury to an occupant. An airbag includes a pair of lobes or protrusions to deploy and extend from the rear face of the airbag on either side of the occupant's head to limit rotation of the head. A pair of vertical tethers within an interior of the airbag configure the lobes and contour the rear face to form one or more low fabric tension zones or bubbles. The lobes maintain high fabric tension, similar to a pressurization of a main inflatable chamber of the airbag.

20 Claims, 12 Drawing Sheets

(51) Int. Cl.
*B60R 21/231* (2011.01)
*B60R 21/00* (2006.01)

(56) References Cited

U.S. PATENT DOCUMENTS

| | | | |
|---|---|---|---|
| 5,253,892 A * | 10/1993 | Satoh | B60R 21/233 |
| | | | 280/731 |
| 5,362,101 A | 11/1994 | Sugiura et al. | |
| 6,254,121 B1 | 7/2001 | Fowler et al. | |
| 6,254,130 B1 | 7/2001 | Jayaraman et al. | |
| 6,454,300 B1 | 9/2002 | Dunkle et al. | |
| 6,857,659 B2 | 2/2005 | Webber | |
| 7,377,548 B2 | 5/2008 | Bauer et al. | |
| 7,506,892 B2 | 3/2009 | Klinkenberger et al. | |
| 7,552,942 B2 | 6/2009 | Fischer et al. | |
| 7,625,008 B2 | 12/2009 | Pang et al. | |
| 7,631,895 B2 | 12/2009 | Kalliske et al. | |
| 7,661,700 B2 | 2/2010 | Imamura et al. | |
| 7,766,385 B2 | 8/2010 | Fukawatase et al. | |
| 7,850,203 B2 | 12/2010 | Niwa et al. | |
| 7,862,073 B2 | 1/2011 | Thomas | |
| 8,256,798 B2 | 9/2012 | Yamazaki | |
| 8,308,188 B2 | 11/2012 | Kumagai et al. | |
| 8,371,612 B2 | 2/2013 | Williams | |
| 8,419,054 B2 | 4/2013 | Abe | |
| 8,678,429 B2 | 3/2014 | Nagasawa et al. | |
| 8,864,170 B2 * | 10/2014 | Yamada | B60R 21/2338 |
| | | | 280/732 |
| 8,899,618 B2 * | 12/2014 | Eckert | B60R 21/203 |
| | | | 280/731 |
| 9,150,189 B1 * | 10/2015 | Nelson | B60R 21/2338 |
| 9,434,344 B2 | 9/2016 | Fukawatase | |
| 9,499,118 B2 | 11/2016 | Jindal et al. | |
| 9,522,648 B2 | 12/2016 | Fukawatase | |
| 9,623,831 B1 | 4/2017 | Deng et al. | |
| 9,650,011 B1 * | 5/2017 | Belwafa | B60R 21/233 |
| 9,676,355 B2 | 6/2017 | Kruse | |
| 9,676,362 B1 * | 6/2017 | Deng | B60R 21/233 |
| 9,676,364 B2 | 6/2017 | Williams | |
| 9,738,243 B2 | 8/2017 | Fukawatase et al. | |
| 9,758,123 B2 | 9/2017 | Yamada et al. | |
| 9,771,047 B2 | 9/2017 | Kruse et al. | |
| 9,789,842 B2 | 10/2017 | Shin | |
| 9,840,223 B2 | 12/2017 | Choi et al. | |
| 9,845,067 B2 | 12/2017 | Morris et al. | |
| 2004/0174003 A1 * | 9/2004 | Dominissini | B60R 21/233 |
| | | | 280/729 |
| 2004/0256848 A1 * | 12/2004 | Miyata | B60R 21/233 |
| | | | 280/743.2 |
| 2005/0098994 A1 | 5/2005 | Matsumura | |
| 2005/0110249 A1 | 5/2005 | Hasebe | |
| 2005/0184489 A1 | 8/2005 | Kobayashi | |
| 2006/0186647 A1 | 8/2006 | Bosch | |
| 2006/0186656 A1 | 8/2006 | Kumagai | |
| 2006/0279072 A1 | 12/2006 | Hanawa et al. | |
| 2007/0108753 A1 * | 5/2007 | Pang | B60R 21/231 |
| | | | 280/743.2 |
| 2008/0023943 A1 | 1/2008 | Kwon | |
| 2009/0194981 A1 | 8/2009 | Mendez | |
| 2009/0224522 A1 * | 9/2009 | Fischer | B60R 21/231 |
| | | | 280/743.1 |
| 2009/0302587 A1 | 12/2009 | Thomas | |
| 2010/0032931 A1 | 2/2010 | Kumagai et al. | |
| 2012/0025505 A1 * | 2/2012 | Abramoski | B60R 21/231 |
| | | | 280/743.2 |
| 2013/0001934 A1 | 1/2013 | Nagasawa et al. | |
| 2014/0327234 A1 * | 11/2014 | Heurlin | B60R 21/207 |
| | | | 280/730.1 |
| 2016/0207490 A1 * | 7/2016 | Yamada | B60R 21/2338 |
| 2016/0250993 A1 * | 9/2016 | Nagatani | B60R 21/2338 |
| | | | 280/730.1 |
| 2016/0280176 A1 * | 9/2016 | Yamada | B60R 21/205 |
| 2016/0311392 A1 * | 10/2016 | Jindal | B60R 21/231 |
| 2017/0015266 A1 * | 1/2017 | El-Jawahri | B60R 21/01512 |
| 2017/0088080 A1 * | 3/2017 | Hotta | B60R 21/2338 |
| 2017/0088087 A1 | 3/2017 | Williams | |
| 2017/0129444 A1 * | 5/2017 | Fukawatase | B60R 21/233 |
| 2017/0136981 A1 | 5/2017 | Fukawatase et al. | |
| 2017/0166159 A1 | 6/2017 | Shin | |
| 2017/0253212 A1 | 9/2017 | Choi et al. | |
| 2018/0111581 A1 | 4/2018 | Wang et al. | |

FOREIGN PATENT DOCUMENTS

| | | |
|---|---|---|
| DE | 102015004956 A1 | 10/2016 |
| JP | H0332956 A | 2/1991 |
| JP | H1148906 A | 2/1999 |
| JP | 2006088856 A | 4/2006 |
| JP | 2008044594 A | 2/2008 |
| JP | 2011225139 A | 11/2011 |
| JP | 5491332 B2 | 3/2012 |
| JP | 5408268 B2 | 2/2014 |
| JP | 5483568 B2 | 5/2014 |
| JP | 2014237382 A | 12/2014 |
| WO | 2008063103 A1 | 5/2008 |
| WO | 2016147732 A1 | 9/2016 |

OTHER PUBLICATIONS

International Search Report and Written Opinion for PCT/US2017/040048, dated Sep. 12, 2017.
Final Office Action dated Sep. 7, 2018 in U.S. Appl. No. 15/331,257.
Non-Final Office Action dated Mar. 27, 2018 in U.S. Appl. No. 15/331,257.
Restriction Requirement dated Oct. 30, 2017 in U.S. Appl. No. 15/331,257.
Wang, et al., Notice of Allowance dated Mar. 6, 2019 for U.S. Appl. No. 15/331,257.
Wang, et al., Advisory Action dated Nov. 8, 2018 in U.S. Appl. No. 15/331,257.
Wang, et al., Notice of Allowance dated Dec. 6, 2018 in U.S. Appl. No. 15/331,257, filed Dec. 6, 2018, 7 pages.

* cited by examiner

FRONTAL AIRBAG ASSEMBLIES FOR REDUCING ROTATIONAL VELOCITY OF A HEAD OF AN OCCUPANT

TECHNICAL FIELD

The present disclosure relates generally to the field of automotive protective systems. More specifically, the present disclosure relates to inflatable airbag assemblies.

BACKGROUND

Inflatable airbags may be mounted within a vehicle and deployed during a collision event. A deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
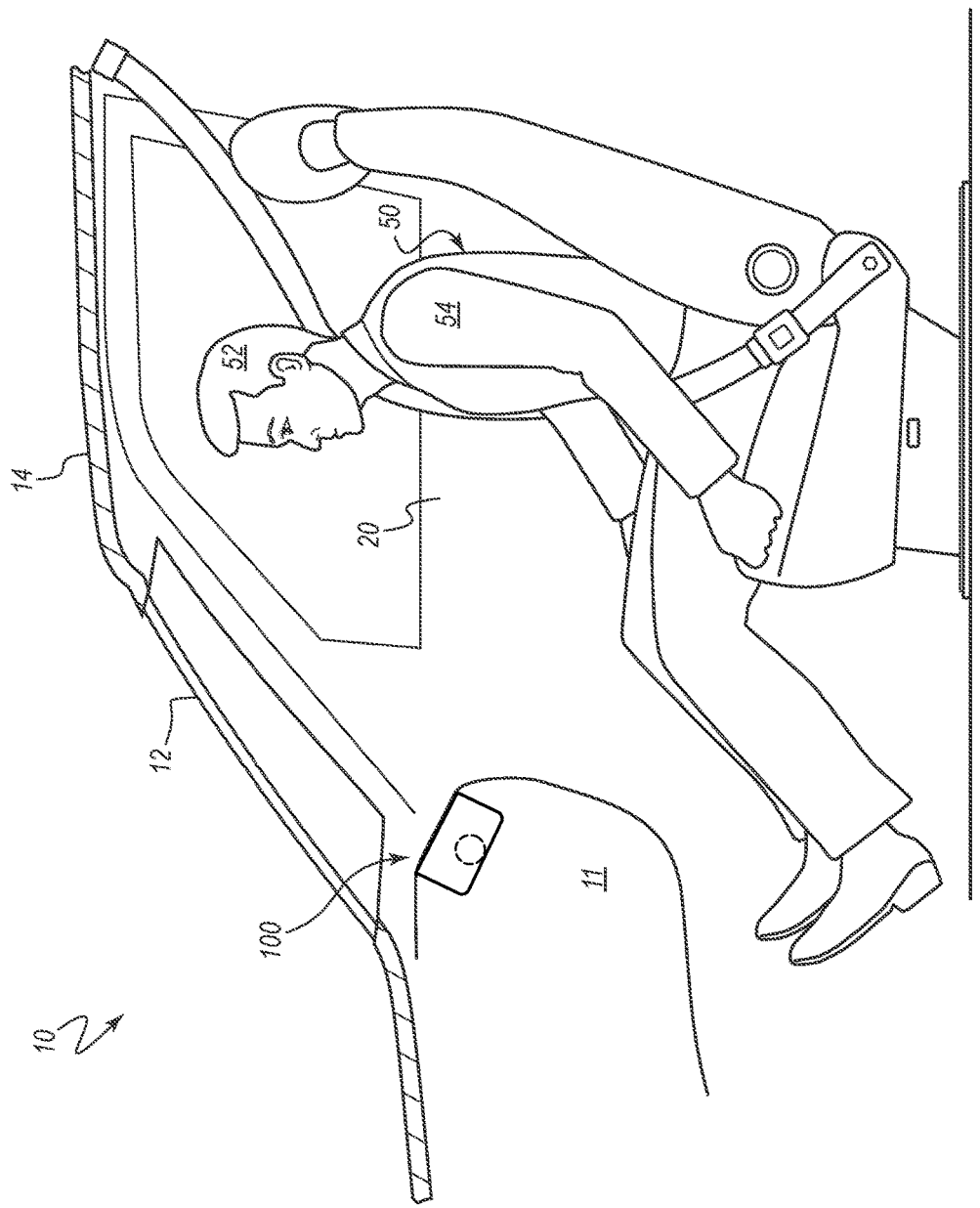
FIG. 1 is a side view of an airbag assembly, according to one embodiment of the disclosures, prior to deployment.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrase "attached to" refers to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas) can flow from one element to another element when the elements are in fluid communication with each other. The phrase "vehicle occupant position" refers to the position in which an occupant is generally positioned when seated in a seat of a vehicle. The term "occupant" refers to a person or crash test dummy within a vehicle. As used herein, the terms "forward" and "rearward" are used with reference to the front and back of the relevant vehicle. For example, an airbag cushion that deploys in a rearward direction deploys toward the back of a vehicle. Furthermore, other reference terms, such as horizontal, are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill). Unless otherwise stated, all ranges include both endpoints and all numbers between the endpoints.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for cushioning a front-seat passenger, and may be mounted in a dashboard. An airbag assembly can mitigate injury to an occupant of a vehicle during a collision event by reducing the effect of impact of the occupant against structures (body-structure impact) within the vehicle (such as, e.g., a dashboard, or door column). While airbag assemblies are useful in mitigating such injuries, occupant impact on an airbag assembly introduces a risk for other injuries. For example, prior to a collision event, an occupant's head is in motion more or less synchronously with the vehicle. During the collision event, the vehicle's direction of travel and speed may be altered severely and abruptly. When such a collision triggers the deployment of an airbag cushion from an airbag assembly, the airbag cushion accelerates in a direction specifically relative to the vehicle. That is, a frontal airbag will deploy nominally rearward from the dashboard. Because the collision event itself has altered the direction of the vehicle's travel, the occupant, even if restrained by a modern three-point harness, may no longer be in synchronous movement with the vehicle. Moreover, the occupant may impact the airbag in such a way that some degree of injury may result from the impact with the airbag, even though this impact mitigates injury from body-structure impacts. For example, an occupant's head may be accelerated rotationally relative to the spine as a result of impacting the airbag. Such rotation acceleration (and, conversely, deceleration) poses risk of injury to the occupant.

Stated otherwise, as the occupant impacts a frontal airbag, the head of the occupant may twist or rotate with significant rotational (i.e., angular) velocity, which can potentially induce injury. For example, as a front-seat passenger travels in a forward direction and strikes a frontal airbag during a collision event, the occupant's head may rotate about a vertical axis (a "z"-axis) with substantial force.

A risk of traumatic head/brain injury from rapid rotation of the occupant's head can be reduced by employing airbag systems that reduce the rotational velocity of the occupant's head during a collision event. For example, as described in detail herein, a cushion including protruding lobes can be used to reduce the rotational velocity of the head during a collision event.

Embodiments disclosed herein may provide increased cushioning and/or protection from rotational motion of the head, leading to improved head injury criterion (HIC) and/or brain injury criterion (BrIC) scores for an occupant involved in a collision event.

Advantages of various embodiments will be evident from the present disclosure.

FIG. 1 is a side view of an airbag assembly 100, according to one embodiment of the disclosures herein, prior to deployment. The airbag assembly 100 is shown installed in a vehicle 10. The vehicle 10 is equipped with a dashboard (also known as an instrument panel) 11, a windscreen 12, a roof lining 14, and a side door 20. In FIG. 1, an occupant 50 is seated facing forward in the vehicle 10, and the airbag assembly 100 is mounted to the dashboard 11. A torso and/or shoulders 54 and a head 52 of the occupant 50 are in an upright position.

Figure 2A:
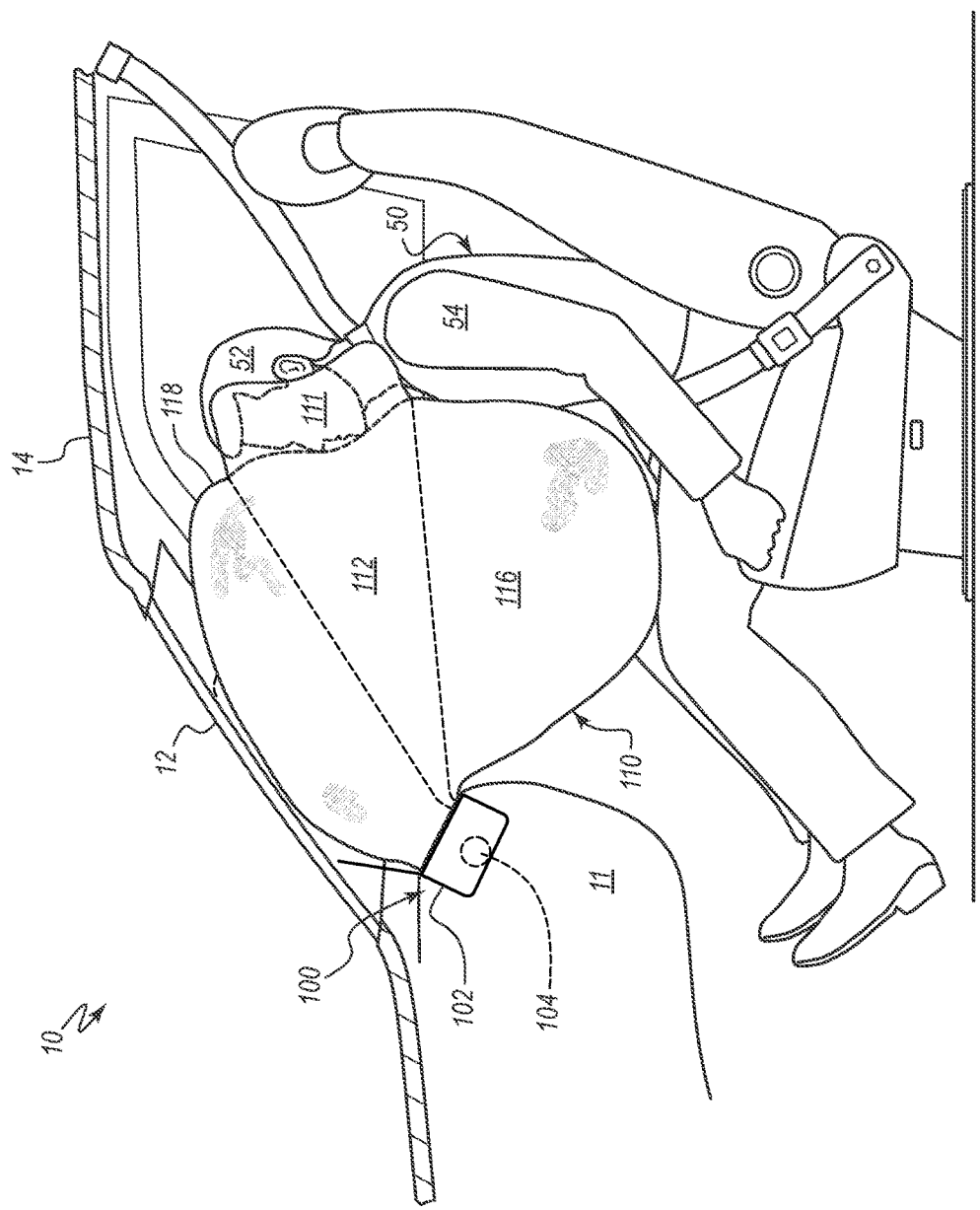
FIG. 2A is a side view of an airbag assembly of FIG. 1 in a deployed state prior to impact by the occupant.

FIG. 2A is a side view of the airbag assembly 100 of FIG. 1 in a deployed state prior to impact by the occupant 50. The airbag assembly 100 may include, among other elements, a housing 102, an inflator 104, and an airbag cushion 110 (also known as an airbag or a gas bag).

The housing 102 may be of any suitable variety, and may include or otherwise be coupled with a cover (not shown), behind which the airbag cushions 110 may be stored in an undeployed state. The housing 102 is mounted in the vehicle 10. The cover may be of any suitable variety, and may include a tear seam or burst seam through which the airbag cushion(s) 110 may deploy. The housing 102 may be mounted within and fixed to, or be in a fixed position relative to, the instrument panel 11 (also known as a dashboard) of the vehicle 10 in any suitable manner.

The inflator 104 may be configured to release inflation gas to inflate the airbag cushion 110. For example, the inflator 104 may be configured to deliver inflation gas through a throat of the airbag cushion 110. The inflator 104 may be configured to initiate inflation of the airbag cushion 110 upon any suitable previously determined events, such as a collision.

The airbag cushion 110 may be manufactured in any suitable manner, such as via one-piece weaving, "cut-and-sew" techniques, or a combination of these and/or other methods. In some embodiments, the airbag cushion 110 can be formed of separate panels that are joined together by sealed or unsealed seams, with the seams formed by any of a variety of suitable techniques. For example, the seams may be formed by stitching, adhesive, taping, radio frequency welding, heat bonding, and/or any other suitable technique or combination of techniques. In some embodiments, the airbag cushion 110 is formed from a suitable arrangement of panels that are attached to one another (e.g., via stitching, adhesives, or other suitable bonding mechanisms) to form an inflatable chamber. In other embodiments, the airbag cushion 110 may be formed from a single unitary piece of material, such as by a one-piece weaving technique. The airbag cushion 110 may include a first lateral face 114 (not shown in FIG. 2A, but see FIG. 2B) that faces outboard toward a side door of the vehicle 10 and a second lateral face 116 that faces inboard toward the interior of the vehicle 10. A rear face 118 may be positioned at a rearward portion of the airbag cushion 110 such that in a deployed inflated state the rear face 118 is positioned to receive the occupant 50, and more particularly the head 52 of the occupant 50 travelling in a forward direction relative to the vehicle. One or more additional faces may connect with the lateral faces 114, 116 to form the airbag cushion 110.

The airbag cushion 110 may be configured to receive a front side of the head 52 of the occupant 50 during a collision event. When inflated, the airbag cushion 110 may be disposed directly forward of a vehicle occupant position. In FIG. 2A, the occupant 50 is in an upright position about to impact the deployed airbag cushion 110. The airbag cushion 110 has been deployed from the airbag assembly housing 102 by operation of the inflator 104. The deployed airbag cushion 110, as shown in this embodiment, includes a lobe 111 on either side of the head 52 of the occupant 50, and two internal, vertical tethers 112. Each tether 112 connects at a front face or other forward portion of the airbag cushion 110, and on the inner surface of the rear face 118 of the airbag cushion 110 situated so as to form an area to receive the face of the occupant 50. In certain embodiments, the airbag cushion 110 may not rest against the windscreen 12 and/or the roof lining 14 after deployment and before impact by the occupant 50.

Figure 2B:
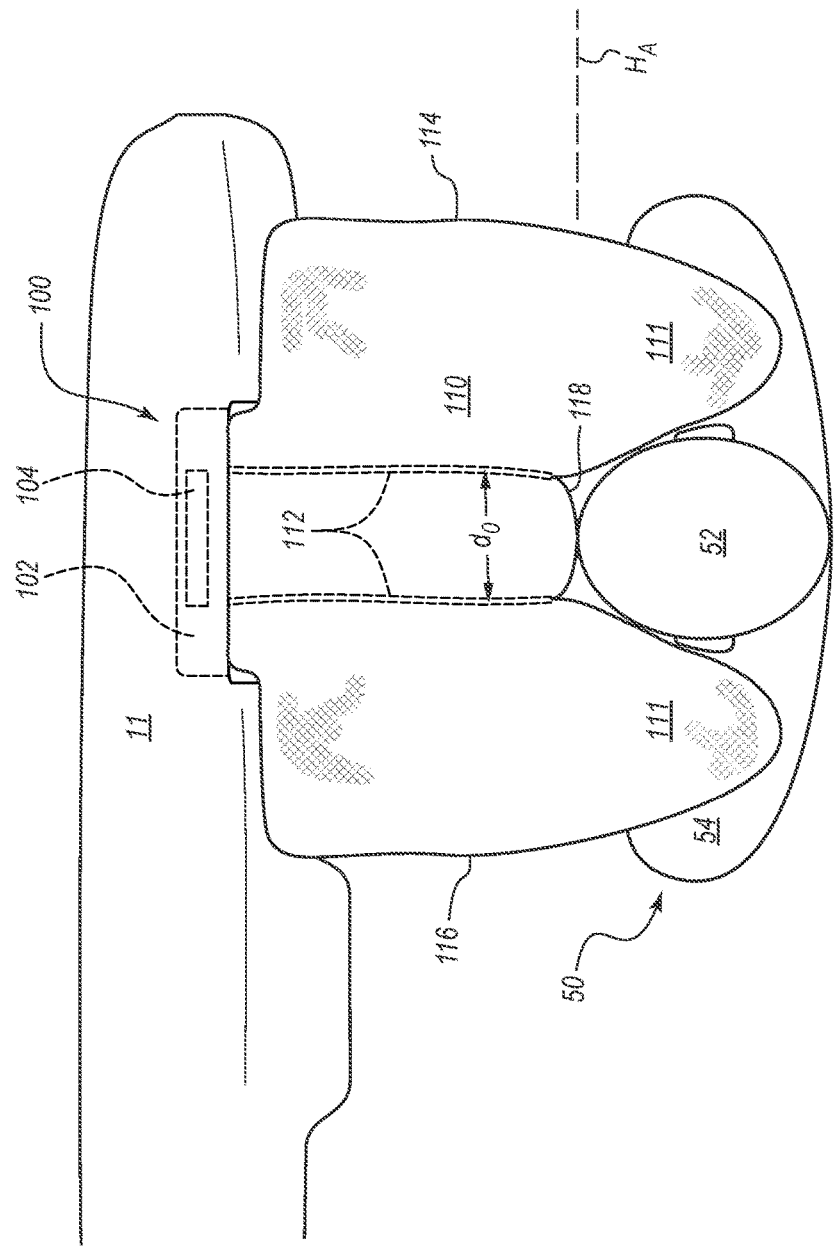
FIG. 2B is a top view of an airbag assembly of FIGS. 1 and 2A in a deployed state prior to impact by the occupant, similar to FIG. 2A.

FIG. 2B is a top view of the airbag assembly 100 of FIGS. 1 and 2A in a deployed state prior to impact by the occupant 50, similar to FIG. 2A. In FIG. 2B, the airbag cushion 110 has been deployed from the airbag assembly housing 102 by operation of the inflator 104. The housing 102 is mounted in the instrument panel 11 of the vehicle. The airbag 110 includes the two lobes 111, each of which is deployed on either side of the head 52 of the occupant 50, and above the torso/shoulders 54. A first lateral face 114 faces outboard toward a side door of the vehicle and a second lateral face 116 faces inboard toward the interior of the vehicle. The airbag cushion 110 includes two internal tethers 112 which facilitate deployment and formation of the lobes 111. The tethers 112 are secured at an interior of the airbag cushion at a forward portion of the airbag cushion 110 and also secured at an interior surface of the rear face 118 (or occupant facing panel). The tethers 112 are secured at the rear face 118 at an offset distance $d_O$ along a horizontal axis $H_A$ of the airbag cushion 110. The tethers extend from the forward portion rearward through the interior of the airbag cushion 110 (e.g., through an inflatable chamber of the airbag cushion 110). The tethers 112 are vertical tethers because a connection at the rear face 118 extends generally vertically, or generally up and down from a top portion of the rear face 118 toward a bottom portion of the rear face 118. As the tethers 112 are drawn taut during inflation and expansion of the airbag cushion 110, the tethers 112 draw the rear face 118, proximally fixing the rear face 118 while the lobes 111 deploy rearward on either side of the rear face 118 and the head 52 of the occupant 50. As the tethers 112 draw and position the rear face 118, at least one low tension zone or bubble is created within the rear face 118 (not depicted, but see, e.g., 413 in FIG. 4). The low fabric tension zone(s) may reduce a possibility of the airbag cushion 110 inducing rotation of the head 52.

The lobes 111 deploy to either side of the head 52 by function of the tethers 112. The lobes 111 are formed so as to provide a high tension fabric zone (not depicted, but see, e.g., 415 in FIG. 4) on an occupant facing panel of each lobe 111. The high fabric tension zone on either lobe 111 (or on both) may serve to reduce or limit rotation of the head 52. The high fabric tension zone provides support to prevent or limit the occupant from breaking through (travelling through) the lobes 111. The lobes 111 may receive and/or contact or engage the head 52 of the occupant 50 and provide support to the sides of the head so as to counteract forces on the head 52 that may cause rotation of the head 52 clockwise or counterclockwise within a plane of the drawing sheet of FIG. 2B and around the axis $Z_A$ shown in FIG. 2C.

Figure 2C:
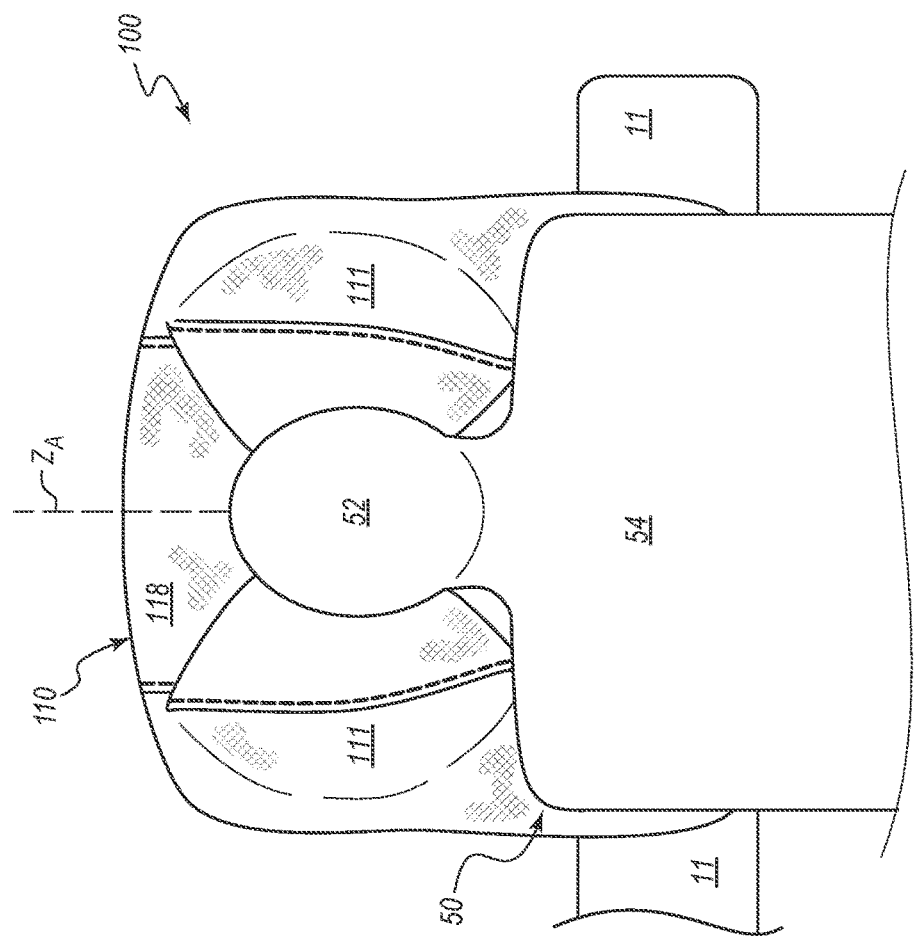
FIG. 2C is a rear view of an airbag assembly of FIGS. 1, 2A and 2B in a deployed state prior to impact by the occupant.

FIG. 2C is a rear view of the airbag assembly 100 and the occupant 50 depicted in FIGS. 1, 2A, and 2B in a deployed state prior to impact by the occupant 50. In at least one embodiment, the airbag cushion 110 includes two lobes 111 deployed one to either side of the head 52 of the occupant 50 and above the torso/shoulders 54. The two lobes 111 may serve to limit rotation of the head 52. The lobes 111 may receive and/or contact or engage the head 52 of the occupant 50 and provide support to sides of the head 52 to counteract forces on the head 52 that would cause rotation of the head 52 about an axis $Z_A$.

The rear face 118 may be positioned at a rearward portion of the airbag cushion 110 such that in a deployed inflated state the rear face 118 is positioned to receive the occupant 50, and more particularly the head 52 of the occupant 50 travelling in a forward direction relative to the vehicle.

Figure 3:
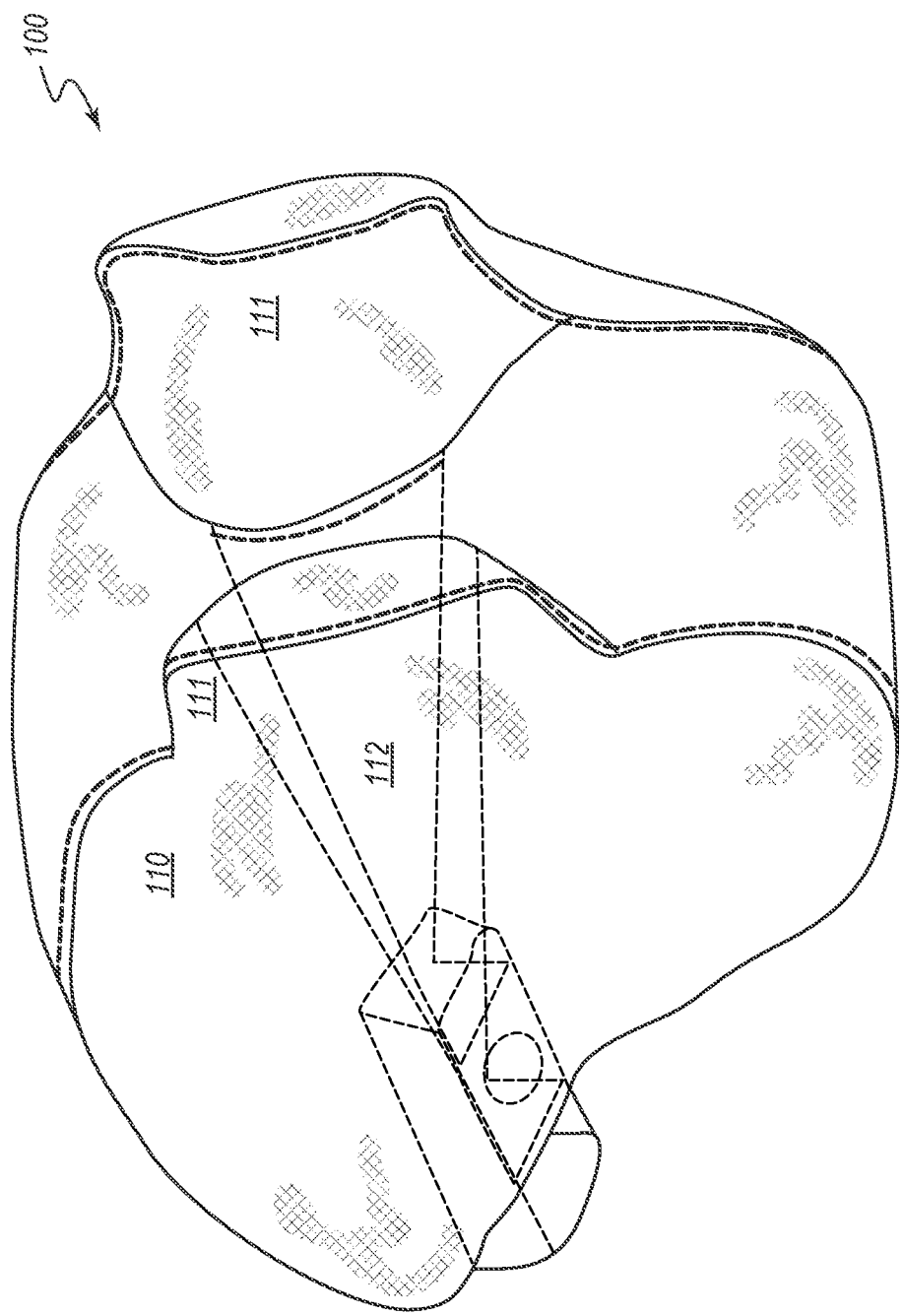
FIG. 3 is an isometric view of an airbag assembly depicted in FIGS. 1 and 2A-2C in a deployed state.

FIG. 3 is an isometric view of the airbag assembly 100 depicted in FIGS. 1 and 2A-2C in a deployed state. In the embodiment shown, the airbag cushion 110 has been deployed from the airbag assembly housing 102 mounted to the dashboard (not depicted) by operation of an inflator (not depicted). The airbag cushion 110 includes at least the two internal tethers 112, and the two lobes 111 deployed one to either side of the upper portion of the airbag cushion 110. The internal tethers 112 are situated somewhat side-by-side, are generally vertical relative to the vehicle itself, and deploy longitudinally when the airbag cushion 110 is inflated, and attach to the inward surface of the rear face 118 (see FIGS. 2B, 2C) of the airbag cushion 110 with approximately vertical seams. The internal tethers 112 help form and deploy the two lobes 111, and also create low and high fabric tension zones (not depicted), as further described in FIGS. 4, 5, and 6). The two lobes 111 are positioned to receive an occupant and limit rotation of an occupant's head (not depicted).

Figure 4:
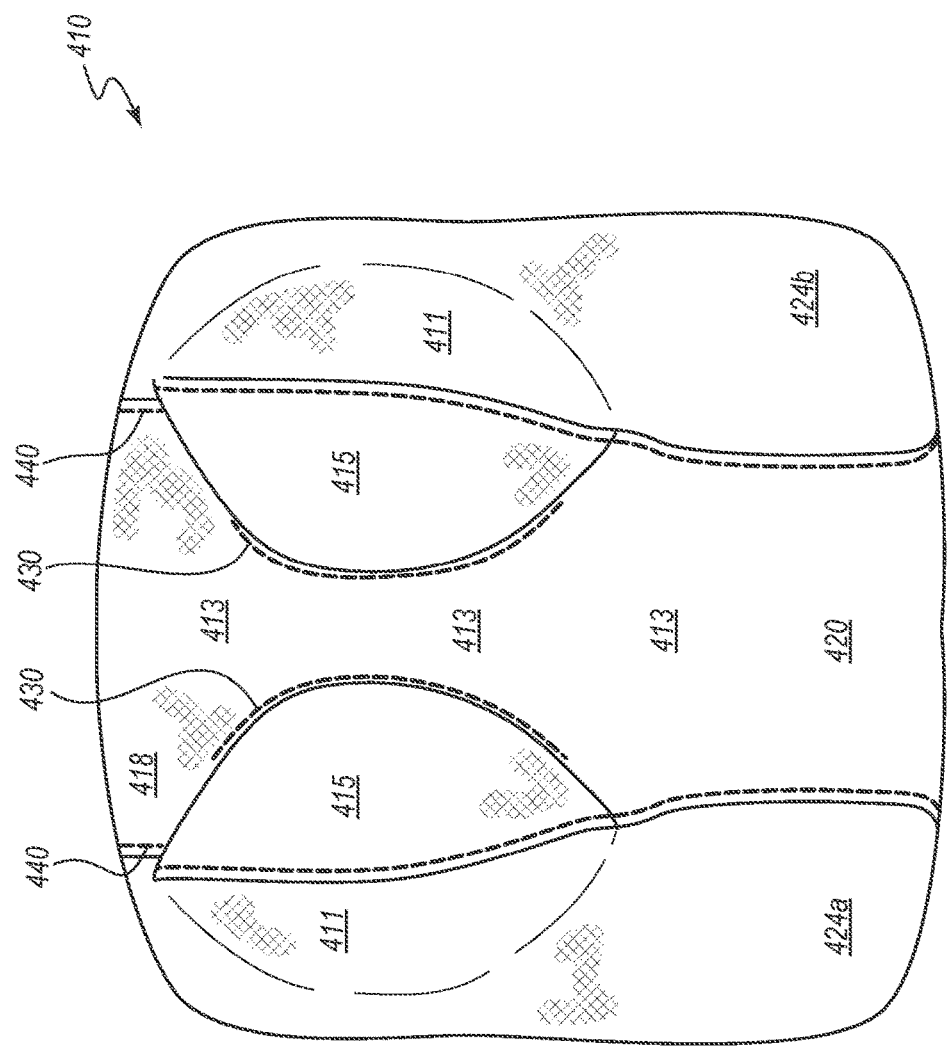
FIG. 4 is a rear view of an airbag cushion, according to one embodiment, that is similar to the airbag cushion depicted in FIGS. 1, 2A-2C, and 3 in a deployed state.
Figure 5:
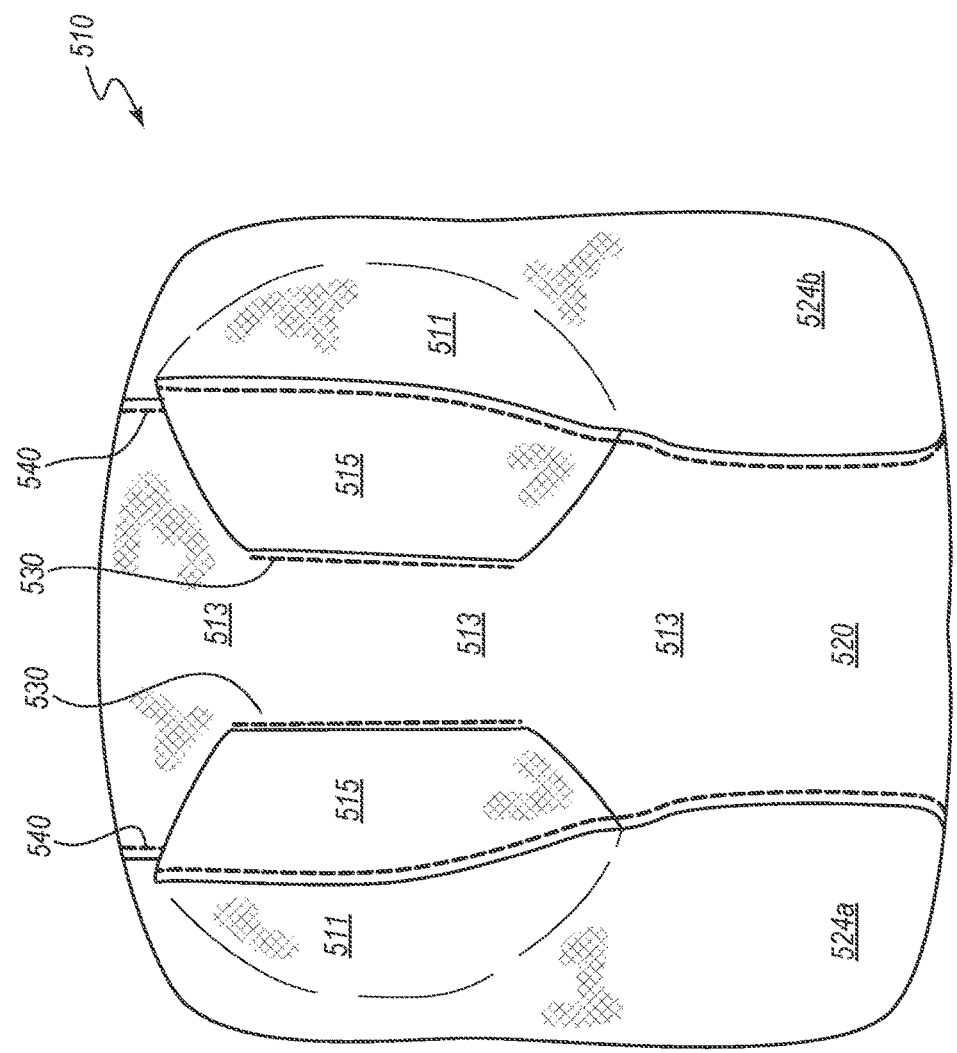
FIG. 5 is a rear view of an airbag cushion, according to another embodiment, in a deployed state.
Figure 6:
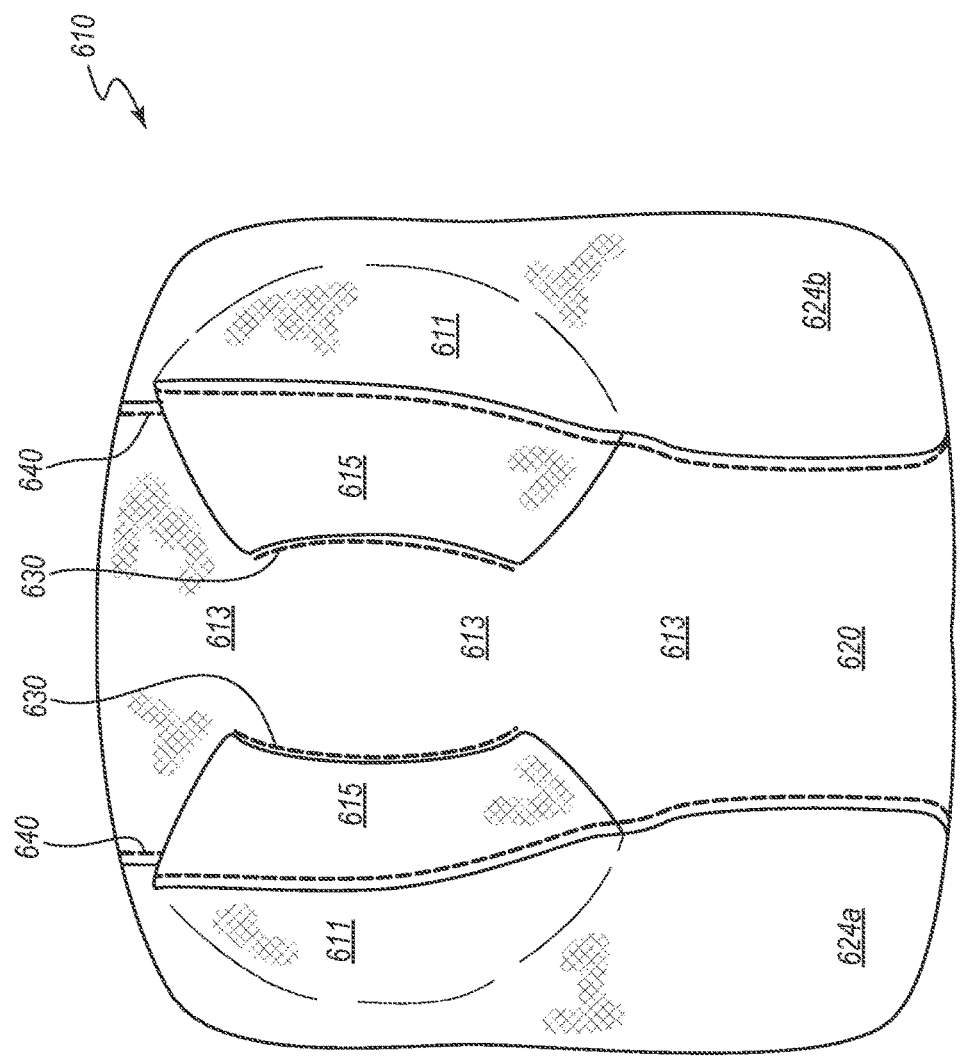
FIG. 6 is a rear view of an airbag cushion, according to another embodiment, in a deployed state.

FIGS. 4, 5, and 6 each present a rear view of an airbag cushion of an airbag assembly, each according to one embodiment and in a deployed state. Each embodiment of an airbag cushion depicted may be included in an airbag assembly, similar to the airbag cushion 110 of FIGS. 1, 2A, 2C, and 3. In each embodiment shown, the airbag cushion has been deployed from an airbag assembly housing mounted to a dashboard by operation of an inflator. The airbag cushion includes two lobes deployed one to either side of the upper portion of the airbag cushion. In each of FIGS. 4, 5, and 6, the airbag cushion includes a main panel and side panels that couple together at seams to form an inflatable chamber. Each airbag cushion of FIGS. 4, 5, and 6 includes at least two tethers (not depicted) which help deploy and form the lobes and the low and high fabric tension zones. Some of the seams may be formed by sewing or adhering together the edges of the main panel and side panels. Other seams likewise may be formed by sewing or adhering the edges of the internal tethers (not depicted) to the internal surface of the rear face of the main panel. The seams can be sealed (to not permit airbag gases to escape), semi-permeable (to permit a limited amount of airbag gases to escape), or permeable (to permit a greater amount of airbag gases to escape).

In each embodiment shown in FIGS. 4, 5, and 6, the lobes 111 deploy to either side of an occupant's head such that the lobes are above the torso area and shoulders of the occupant and do not nominally interact with the torso or shoulders. The internal tethers (not depicted) serve to form the lobes with a high fabric tension zone on a lobe surface facing the occupant's head, and also form at least one low fabric tension zone or bubble in the contact surface of the rear face of the airbag cushion main panel. The low fabric tension zone(s) on the main panel of the airbag cushion serve(s) to reduce the rotation of the head upon contact with the airbag cushion. For example, the low fabric tension zones may be softer and more accommodating to receive the head of the occupant. The high fabric tension zones on the occupant-facing surfaces of the lobes serve to limit head rotation.

FIG. 4 is a rear view of an airbag cushion 410 similar to the airbag cushion 110 depicted in FIGS. 1, 2A-2C, and 3 in a deployed state. The airbag cushion 410 includes a main panel 420 and side panels 424a and 424b configured to couple together to form a main inflatable chamber and form two lobes 411 (e.g., one inboard lobe and one outboard lobe) protruding from a rear face 418. The two lobes 411 are formed by a shape and a coupling of the main panel 420 and the side panels 424a and 424b at main seams 440. The main seams 440 may be formed by sewing or adhering together the edges of the main panel 420 and side panels 424a and 424b The panels 420, 424a, and 424b include attachment tabs or flaps to attach and couple the panels 420, 424a, and 424b together to form the lobes 411. The lobes are also formed by at least two tethers (not depicted) coupled at a forward portion of the airbag cushion 410 and at an interior surface of the rear face 418 of the airbag cushion 410 at tether seams 430. The tether seams 430 likewise may be formed by sewing or adhering the edges of the internal tethers (not depicted) to an internal surface of the main panel 420 at the rear face 418. The tether seams 430 and the main seams 440 can be sealed (to not permit airbag gases to escape), semi-permeable (to permit a limited amount of airbag gases to escape), or permeable (to permit a greater amount of airbag gases to escape).

In this embodiment, the tether seams 430 that connect the internal tethers (not depicted) to the main panel 420 of the airbag cushion 410 are curved tether seams 430. In this example, the tether seams 430 curve outward toward the side panels 424a and 424b and the main seams 440. This attachment method of the internal tethers (not depicted) can be permeable, semi-permeable, or sealed, and helps to form the lobes 411, the contact surface of the main panel 420 of the airbag cushion 410 main panel 420, and both the low fabric tension zone(s) 413 (or bubbles) and high fabric tension zones 415 each to a specific shape. The low fabric tension zones 413 provide an impact surface between the lobes 411.

The placement of the tether seams 430 laterally, vertically, as well as the offset distance, or any combination of these with respect to the main panel 420 may vary in different embodiments, as may the length of the tether seams 430, and the radius of the arc of the tether seams 430. Such variation in the tether seams 430 may result in the formation of different sizes and shapes of the low and high fabric tension zones 413, 415. The rear edge of the tethers (not depicted, but see 126c, 126d in FIG. 7) can be straight so as to form the flat or "tented" low fabric tension zone 413, or they can be curved toward the lateral sides of the airbag cushion 410 so as to create the "pocket" low fabric tension zone 413. The "pocket" low fabric tension zone 413 may also be "tented."

FIG. 5 is a rear view of another embodiment of an airbag cushion 510 in a deployed state. The airbag cushion 510 is formed of a plurality of panels 520, 524a, 524b coupled together to form a main inflatable chamber and a pair of lobes 511 or protrusions. In this embodiment, the tether seams 530 connect the internal tethers (not depicted) to a main panel 520 of the airbag cushion 510 by means of the straight vertical tether seams 530. This attachment method of the internal tethers (not depicted) can be permeable, semi-permeable, or sealed, and helps to form a plurality of lobes 511, the contact surface of the main panel 520 of the airbag cushion 510, and both the low fabric tension zone(s) 513 and the high fabric tension zones 515 each to a specific shape.

The placement of the tether seams 530 laterally, vertically, as well as the offset distance, or any combination of these with respect to the main panel 520 may vary in different embodiments, as may the length of the tether seams 530. Such variation in the tether seams 530 may result in formation of different sizes and shapes of the low fabric tension zones 513 and the high fabric tension zones 515. The rear edge of the tethers (not depicted, but see, e.g., 126c, 126d in FIG. 7) can be straight so as to form a flat or "tented" low fabric tension zone 513, or they can be curved so as to create "pocket" low fabric tension zone(s) 513. The straight tether seams 530 may be oriented parallel to each other and/or may be parallel to main seams 540 of the airbag cushion 510.

FIG. 6 is a rear view of another embodiment of an airbag cushion 610, in a deployed state. In this embodiment, tether seams 630 connect the internal tethers (not depicted) to a main panel 620 of the airbag cushion 610 by means of the curved tether seams 630. In this example, the tether seams 630 curve inward toward a midline of the airbag cushion 610, bending away from side panels 624a, 624b and main seams 640. This attachment method of the internal tethers can be permeable, semi-permeable, or sealed, and helps to form lobes 611, the contact surface of the main panel 620 of the airbag cushion 610, and both low fabric tension zone(s) 613 and high fabric tension zones 615 each to a specific shape.

The placement of the tether seams 630 laterally, vertically, as well as the offset distance, or any combination of these with respect to the main panel 620 may vary in different embodiments, as may the length of the tether seams 630, and the radius of the arc of the tether seams 630. Such variation in the tether seams 630 may result in the formation of different sizes and shapes of low and high fabric tension zones 613, 615. The rear edge of the tethers (not depicted, but see, e.g., 126c, 126d in FIG. 7) can be straight so as to form the flat or "tented" low fabric tension zone 613, or they can be curved toward a middle of airbag cushion 610 so as to create the "pocket" low fabric tension zone(s) 613.

In embodiments disclosed herein, the edges of the panels may consist of tabs, flaps, or nominal seam allowances, or any combination of these, to facilitate connecting the panels together. The panels may be coupled together by sewing, ultrasonic welding, adhering, taping, or any other method suitable under the disclosures herein, including any combination of suitable connecting methods.

Figure 7:
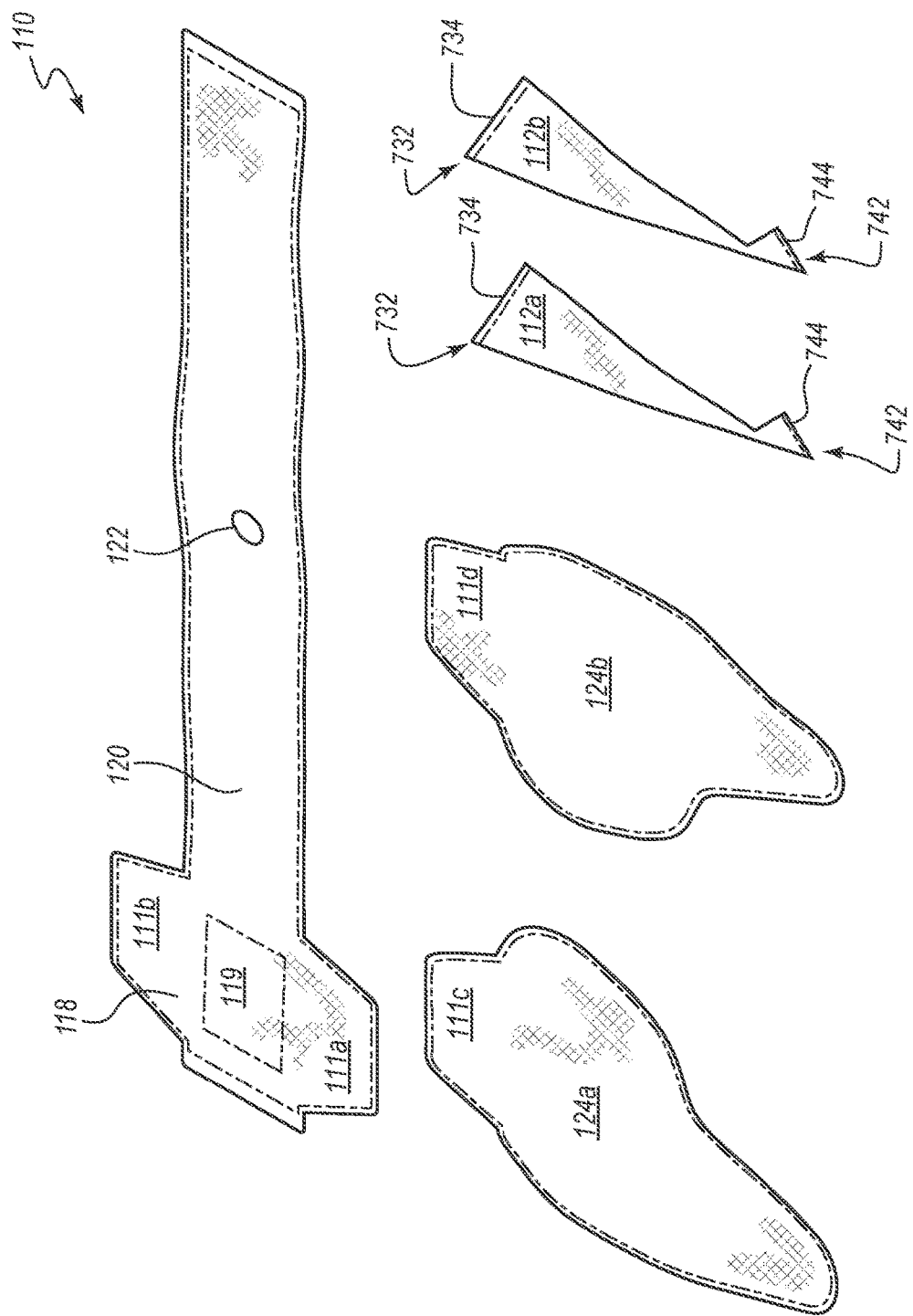
FIG. 7 is an exploded or a disassembled view of an airbag cushion, according to one embodiment.
Figure 8:
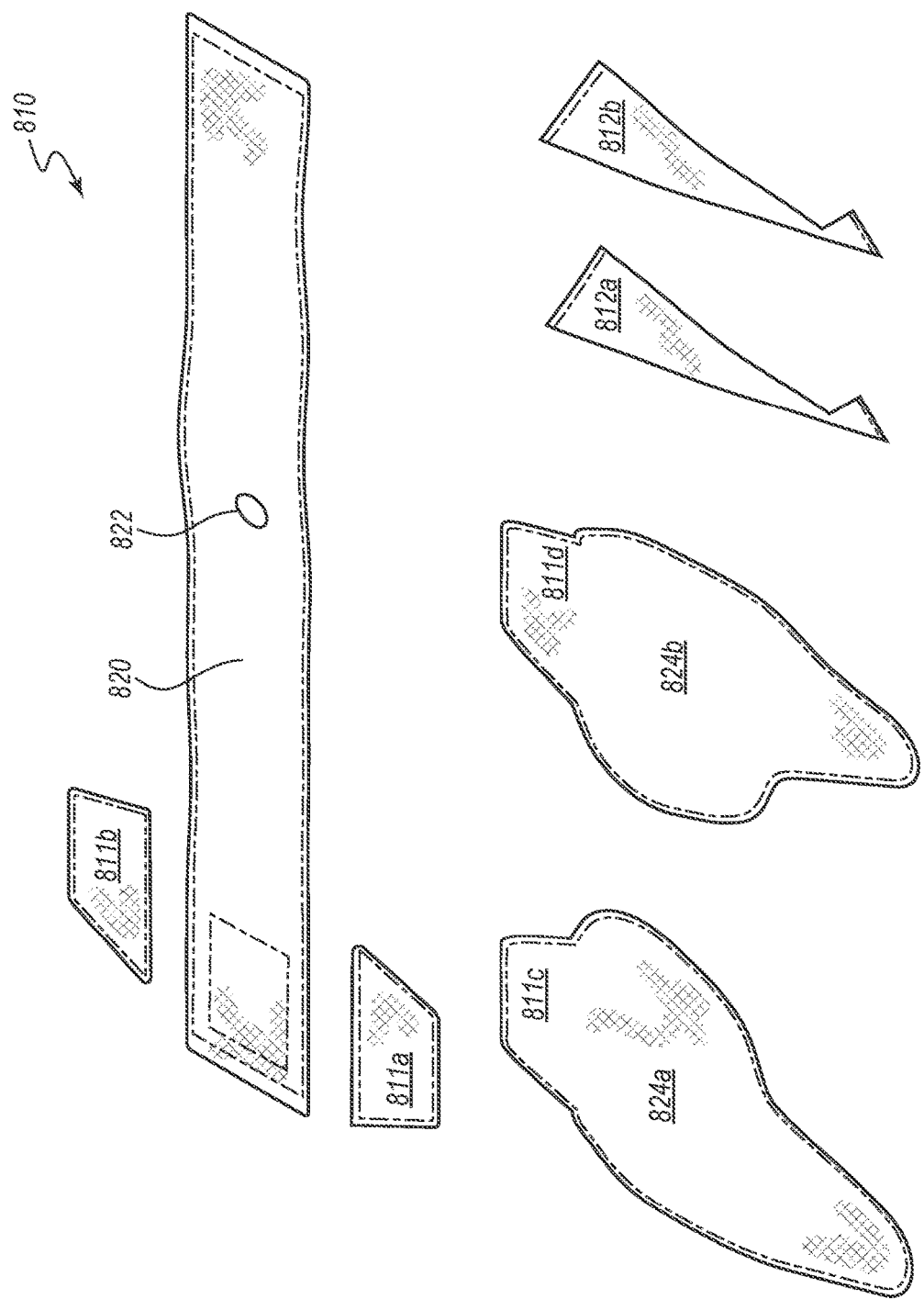
FIG. 8 is an exploded or a disassembled view of an airbag cushion, according to another embodiment.

FIGS. 7 and 8 are each an example of an exploded or a disassembled view of the major components of the airbag cushion depicted in FIGS. 1, 2A-2C, and 3. Panels including the main panel, the side panels, and internal tethers may be used to form the airbag cushion. Other panels or panel shapes (not depicted) may be employed in various embodiments consistent with the disclosures herein. In each embodiment shown, the main panel may include an inflator port or similar means of permitting the inflator (not depicted) to inflate the airbag cushion.

FIG. 7 is an exploded or a disassembled view of the airbag cushion 110 in which the main panel 120 of the airbag cushion 110 incorporates the occupant-facing flaps 111a, 111b of the lobes 111 (see FIGS. 2A, 2B, 2C). The main panel 120 may include an inflator port 122 or other provision to facilitate inflation of the airbag cushion 110. The main panel 120 includes an occupant-facing flap 111a which is to be positioned inboard relative to an occupant, and an occupant-facing flap 111b which is to be positioned outboard relative to the occupant, and which help to form the inboard and outboard lobes 111, respectively. The main panel 120 also forms the rear face 118 that includes a central receiving area 119 for receiving the face of an occupant during a collision event. Side panels 124a and 124b help form the shape of the airbag cushion 110, and are surfaces of the airbag cushion 110 located on the outward sides of the airbag cushion 110. The inboard side panel 124a and the outboard side panel 124b each includes a non-occupant-facing flap 111c, 111d that are to couple with the occupant-facing flaps 111a, 111b to form the inboard and outboard lobes 111, respectively. The non-occupant-facing flap 111c, 111d may be positioned to face away from the occupant so as to have little or no contact with an occupant received by the airbag cushion 110 during a collision event.

Internal tethers 112a and 112b are incorporated internally to the airbag cushion 110 to help form and deploy the lobes 111 in a manner similar to the embodiments previously described. Each tether 112a, 112b includes an occupant-proximal portion 732 that includes a face attachment region 734 that couples to an interior surface of the rear face 118. The face attachment region 734 couples to the rear face 118 so as to be vertically oriented. Each tether 112a, 112b also includes a forward portion 742 that includes a face attachment region 744 that couples to an interior surface of a forward portion of the airbag cushion 110, whether on the main panel 120 or the side panels 124a, 124b.

FIG. 8 is an exploded or a disassembled view of another embodiment of an airbag cushion 810. In this airbag cushion 810, a main panel 820 of the airbag cushion 810 includes inboard and outboard occupant-facing flaps 811a, 811b to form a pair of lobes. The flaps 811a, 811b are distinct components. The flaps 811a, 811b may be attached to the main panel 820 at a portion providing a rear face 818. The flaps 811a, 811b may be sewn, glued, welded, or the like to the main panel 820. The main panel 820 may include an inflator port 822 or other provision to facilitate inflation of the airbag cushion 810.

Side panels 824a, 824b help form the shape of the airbag cushion 810, and provide surfaces of the airbag cushion 810 located on the outward sides of the airbag cushion 810. The side panels 824a, 824b include non-occupant-facing flaps 811c, 811d to form the inboard and outboard lobes and provide the outward surfaces of the pair of lobes. The non-occupant-facing flaps 811c, 811d may be positioned to have little or no contact with an occupant received by the airbag cushion 810. In other embodiments, the flaps 811c, 811d may be separate components and may be attached to the side panels 824a, 824b by sewing, gluing, welding, or other suitable mechanism.

Internal tethers 812a, 812b are incorporated internally to the airbag cushion 810 to help form and deploy the inboard and outboard lobes formed by the flaps 811a, 811b, 811c, 811d consistent with the embodiments disclosed herein.

Figure 9:
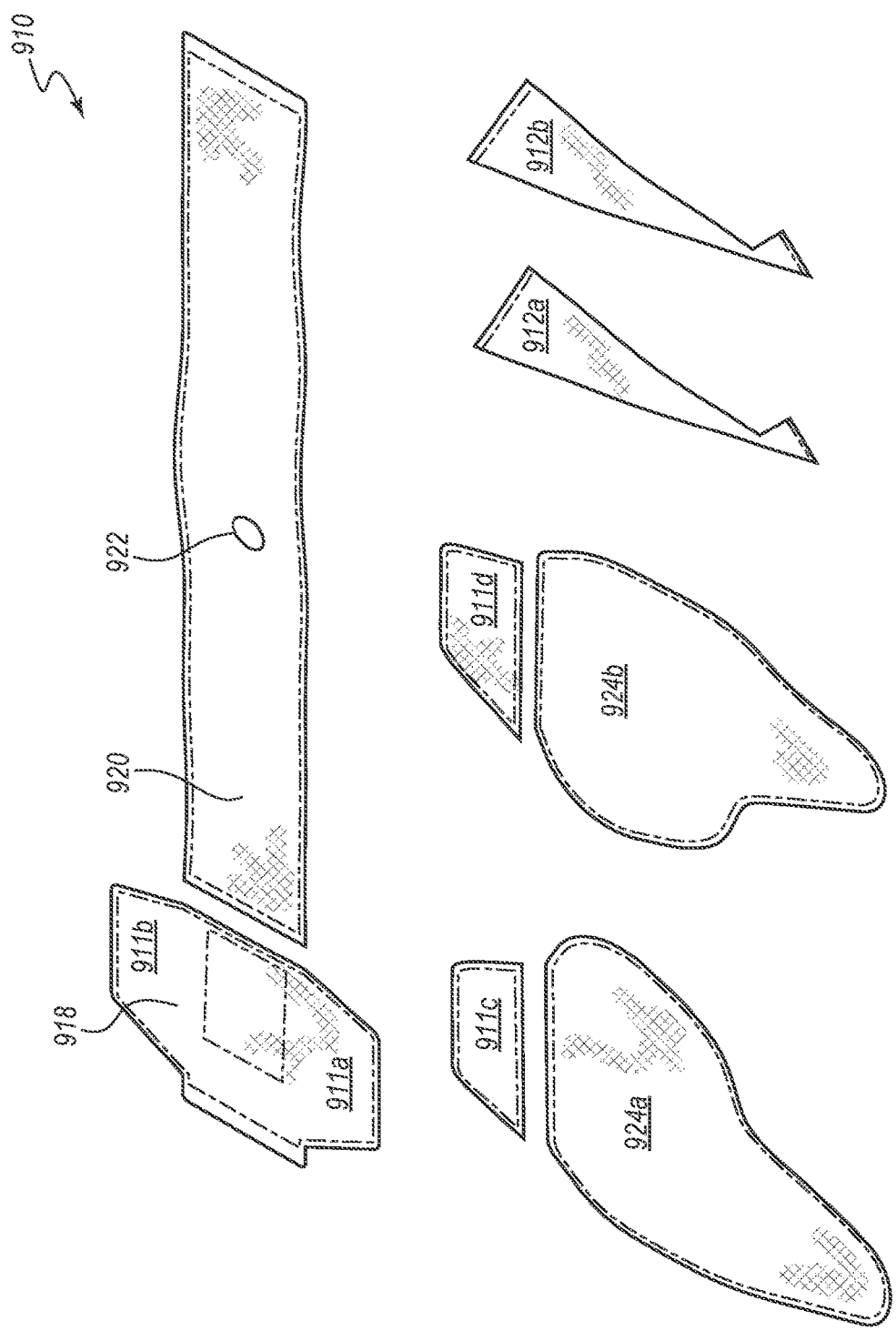
FIG. 9 is an exploded or a disassembled view of an airbag cushion, according to still another embodiment.

FIG. 9 is an exploded or a disassembled view of another embodiment of an airbag cushion 910. In this airbag cushion 910, a rear face portion 918 of the airbag cushion 910 is coupled to a main panel 920. The rear face portion 918 includes integrated inboard and outboard occupant-facing flaps 911a, 911b to form a pair of lobes. The rear face 918 portion may be attached to the main panel 920 in any suitable manner including, but not limited to, via stitching, gluing, welding, or the like. The main panel 920 may include an inflator port 922 or other provision to facilitate inflation of the airbag cushion 810.

Side panels 924a, 924b help form the shape of the airbag cushion 810, and provide surfaces of the airbag cushion 810 located on the outward sides of the airbag cushion 810. Attached to the side panels 924a, 924b are non-occupant-facing flaps 911c, 911d, which couple to the occupant-facing flaps 911a, 911b to form the inboard and outboard lobes and provide the outward surfaces of the pair of lobes. The non-occupant-facing flaps 911c, 911d may be attached to the side panels 924a, 924b in any suitable manner including, but not limited to, via stitching, gluing, welding, or the like. The non-occupant-facing flaps 911c, 911d may be positioned to have little or no contact with an occupant received by the airbag cushion 910.

Internal tethers 912a, 912b are incorporated internally to the airbag cushion 910 to help form and deploy the inboard and outboard lobes formed by the flaps 911a, 911b, 911c, 911d consistent with the embodiments disclosed herein.

Figure 11:
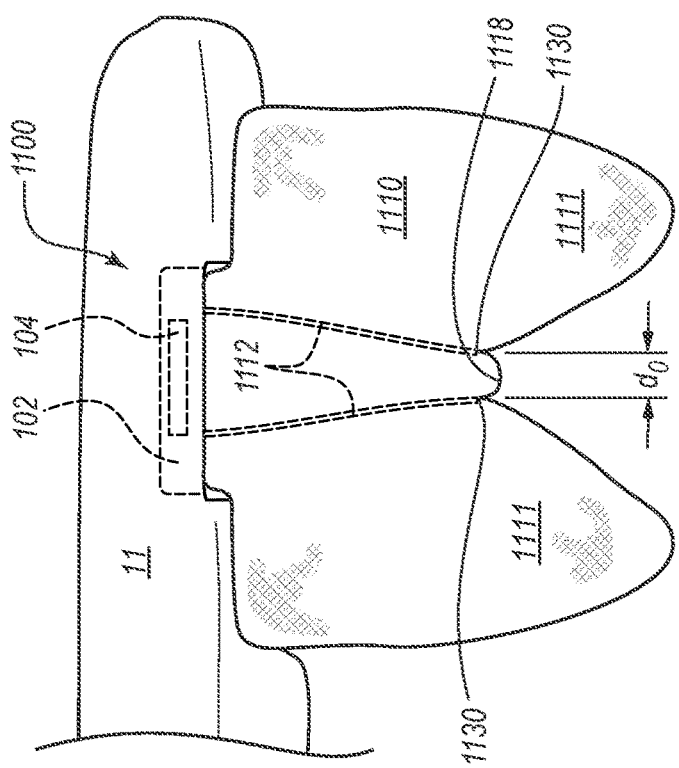
FIG. 11 is a top view of an airbag assembly, according to another embodiment, with a narrow offset distance for the tethers.
Figure 10:
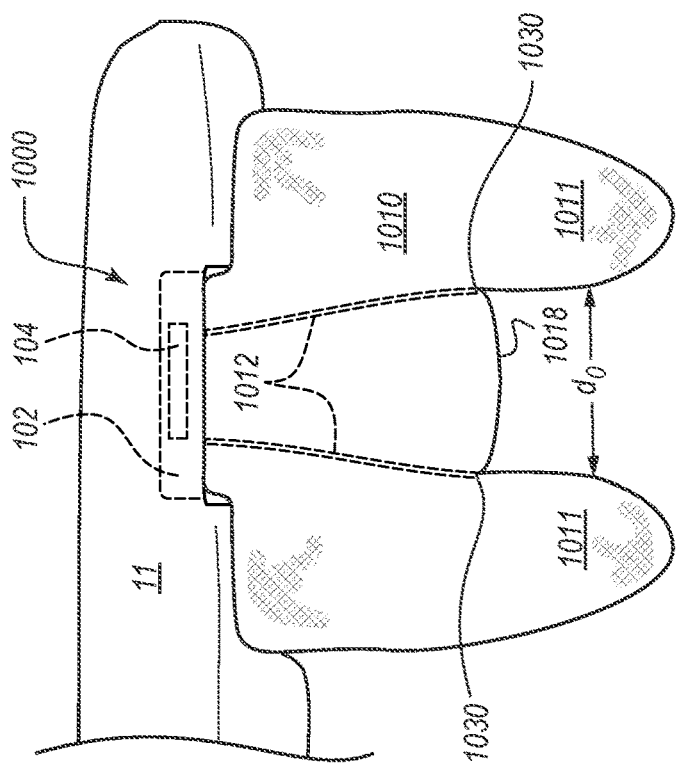
FIG. 10 is a top view of an airbag assembly, according to another embodiment, with a wide offset distance for the tethers.

FIGS. 10 and 11 are top views of two embodiments of an airbag assembly in a deployed state prior to impact by the occupant (not depicted) and having differing offset distances $d_O$ for a pair of tethers 1012, 1112. FIGS. 10 and 11 do not depict every potential embodiment of the disclosures herein. In the embodiments shown, an airbag assembly is attached to the dashboard, and an airbag cushion has been deployed from an airbag assembly housing by operation of an inflator. The airbag cushion includes two lobes, one of which is deployed on either side of a head of an occupant, and above the torso/shoulders. The airbag cushion includes at least two internal tethers which assist in deploying and forming the lobes and a rear facing panel (or impact surface) for receiving an occupant's face is situated between the lobes. The lobes deployed to either side of the head may serve to reduce or limit rotation of the head. (The side panels, and the seams between the side panels and the main panel, are not depicted.)

FIG. 10 is a top view of an embodiment of an airbag assembly 1000 with a wide offset distance $d_O$ between the tethers 1012. The internal tethers 1012 are attached by seams 1030 to a main panel 1020 of an airbag cushion 1010 so as to form a somewhat broad low fabric tension contact zone for the head on a rear facing panel 1018 of the airbag cushion 1010. In this embodiment, the rear facing panel 1018 is relatively broad, resulting in a relatively wide low fabric tension zone or zones (not depicted, but see, e.g., 413 in FIG. 4). A relatively wide low fabric tension zone or zones may provide for greater opportunity to slow any rotation of the occupant's head. A wider or larger offset distance $d_O$ can accommodate potential head trajectory variations according to an accident type, an occupant size, an occupant location. The occupant-facing faces of lobes 1011 are relatively in line with the nominal direction of travel of the occupant's head during an impact, which may serve to prevent the occupant's head from beginning to rotate, or help to avoid inducement of such rotation.

FIG. 11 is a top view of an embodiment of an airbag assembly 1100 with narrow offset distance for a pair of tethers 1112. In this embodiment, the internal tethers 1112 are attached by seams 1130 to a main panel 1120 of an airbag cushion 1110 so as to form a somewhat narrow low fabric tension contact zone for the head on a rear facing panel 1118 of the airbag cushion 1110. A relatively narrow low fabric tension zone or zones may help prevent imparting rotation as a result of impact with the airbag cushion 1110. The occupant-facing faces of lobes 1111 are somewhat oblique relative to the nominal direction of travel of the occupant's head during an impact, which may serve to ameliorate the risk of rotation being caused by impact with the airbag cushion 1110.

Other offset distances for the tethers 1012, 1112 are possible under the disclosures herein to achieve different configurations for the low fabric tension zone(s) on the rear facing panel 1018, 1118 and high fabric tension zones on the lobes 1011, 1111.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. An inflatable airbag cushion comprising:
   a main panel including:
      a pair of flaps that each at least partially defines a lobe of a pair of lobes to inflate to extend rearward from a rear face of the airbag cushion; and
      a central receiving area disposed between the pair of flaps to provide an impact surface between the pair of lobes to receive an occupant;
   a pair of side panels that each couple to an edge of the main panel, each side panel of the pair of side panels including a flap that couples to a flap of the pair of flaps of the main panel to define a lobe of the pair of lobes; and
   a pair of vertical tethers coupled at a first end to a forward portion of the airbag and coupled at a second end to the rear face separated by a tether offset distance horizontally along the rear face, each tether of the pair of vertical tethers coupled to the rear face with a vertical orientation,
   wherein, in the inflated deployed state, the pair of vertical tethers draw the central receiving area of the main panel to define the impact surface between the lobes, and
   wherein the pair of vertical tethers couple to the rear face by a pair of seams arranged in symmetric curves extending in a generally vertical direction with respect to the airbag cushion.

2. The inflatable airbag of claim 1, wherein the pair of lobes in combination with the pair of vertical tethers drawing the central receiving area to define the impact surface configures the impact surface to form low fabric tension bubbles that extend between the pair of lobes.

3. The inflatable airbag of claim 1, wherein the pair of lobes are to provide high fabric tension zones having a pressurization similar to a pressurization within a main inflatable chamber of the airbag cushion.

4. The inflatable airbag of claim 1, wherein the pair of vertical tethers couple to the rear face by a pair of seams arranged in parallel and oriented generally vertical with respect to the airbag cushion.

5. The inflatable airbag of claim 1, wherein the symmetric curves of the pair of seams curve outward away from a centerline of the airbag cushion.

6. The inflatable airbag of claim 1, wherein the symmetric curves of the pair of seams curve inward to open toward a centerline of the airbag cushion.

7. The inflatable airbag of claim 1, wherein the flap of each side panel of the pair of side panels is integrally formed with the side panel.

8. The inflatable airbag of claim 1, wherein the flap of each side panel of the pair of side panels is separately formed and coupled to the side panel.

9. The inflatable airbag of claim 1, wherein the pair of lobes are to receive an occupant and engage a head of the occupant to provide cushioning on the sides of the head during a collision event.

10. An inflatable airbag cushion including an inflatable chamber to receive inflation gas to expand the inflatable airbag cushion to an inflated deployed state for receiving an occupant and reducing a rotational velocity of a head of the occupant during a collision event, the inflatable airbag cushion comprising:
    a main panel providing a rear face to be positioned forward of a vehicle seating position for receiving the head of the occupant during a collision event, the main panel including:
       an inboard flap that at least partially defines an inboard-positioned protrusion to inflate to extend rearward from the rear face at an inboard side of the rear face and inboard of the head of the occupant;
       an outboard flap that at least partially defines an outboard-positioned protrusion to inflate to extend rearward from the rear face at an outboard side of the rear face and outboard of the head of the occupant; and
       a central receiving area disposed between the inboard flap and outboard flap to provide an impact surface between the inboard-positioned protrusion and the outboard-positioned protrusion to receive a face of the occupant;
    an inboard side panel coupled to an inboard edge of the main panel to define the inflatable chamber, the inboard side panel including a flap that couples to the inboard flap of the main panel to define the inboard-positioned protrusion;
    an outboard side panel coupled to an outboard edge of the main panel to define the inflatable chamber, the outboard side panel including a flap that couples to the outboard flap of the main panel to define the outboard-positioned protrusion; and
    a pair of vertical tethers coupled to a front face and extending to couple to the rear face at a tether offset distance along a horizontal axis of the airbag, each tether of the pair of vertical tethers including an occupant-proximal portion that includes a face attachment region that couples to the rear face, wherein the face attachment region is vertically oriented,
    wherein, in the inflated deployed state, the pair of vertical tethers draw the central receiving area of the main panel to define the impact surface between the inboard-positioned protrusion and the outboard-positioned protrusion according to the offset distance,
    wherein the inboard- and outboard-positioned protrusions, in combination with the vertical tethers drawing the central area to define the impact surface, configure the impact surface to form at least one low fabric tension bubble that extends vertically between the inboard- and outboard-positioned protrusions, and
    wherein the pair of vertical tethers couple to the rear face by a pair of seams arranged in symmetric curves extending in a generally vertical direction of the airbag cushion.

11. The inflatable airbag of claim 10, wherein the inboard- and outboard-positioned protrusions comprise high fabric tension protrusions each having a pressurization similar to a pressurization of the inflatable chamber.

12. The inflatable airbag of claim 10, wherein the pair of vertical tethers couple to the rear face by a pair of seams arranged in parallel and extending in a generally top-to-bottom direction of the airbag cushion.

13. The inflatable airbag of claim 10, wherein the symmetric curves of the pair of seams curve outward away from a centerline of the airbag cushion.

14. The inflatable airbag of claim 10, wherein the symmetric curves of the pair of seams curve inward to open toward a centerline of the airbag cushion.

15. The inflatable airbag of claim 10, wherein the flap of the inboard side panel is integrally formed with the inboard side panel.

16. The inflatable airbag of claim 10, wherein the flap of the inboard side panel is separately formed and coupled to the inboard side panel.

17. An inflatable airbag assembly comprising:
an inflator to supply inflation gas;
a housing;
an inflatable airbag cushion to receive inflation gas from the inflator to expand and deploy from the housing, the inflatable airbag cushion comprising:
a main panel including a pair of flaps that each at least partially define a lobe of a pair of lobes to extend rearward from a rear face of the airbag cushion and a central receiving area disposed between the pair of flaps to provide an impact surface between the lobes;
a pair of side panels each coupled to an edge of the main panel, each side panel of the pair of side panels including a flap that couples to one of the flaps of the pair of flaps of the main panel to define the pair of lobes; and
a pair of vertical tethers coupled at a forward portion of the airbag in a vertical orientation and extending to couple to the rear face at a tether offset distance along a horizontal axis of the airbag,
wherein, in an inflated deployed state, the pair of vertical tethers draw the central receiving area of the main panel to define the impact surface between the pair of lobes according to the offset distance, and
wherein the pair of vertical tethers couple to the rear face by a pair of seams arranged in symmetric curves extending in a generally vertical direction with respect to the airbag cushion.

18. The inflatable airbag of claim 17, wherein the pair of lobes in combination with the pair of vertical tethers drawing the central area to define the impact surface configures the impact surface to form low tension bubbles that extend between the pair of lobes.

19. The inflatable airbag of claim 17, wherein the pair of lobes are to receive an occupant and engage a head of the occupant to reduce rotational velocity of the head of the occupant during a collision event.

20. The inflatable airbag of claim 17, wherein the pair of lobes are to receive an occupant and engage a head of the occupant to provide cushioning on the sides of the head during a collision event.

* * * * *